(12) United States Patent
Goldman et al.

(10) Patent No.: US 9,442,945 B2
(45) Date of Patent: Sep. 13, 2016

(54) FILE SYSTEM MANAGER USING TAGGING ORGANIZATION

(75) Inventors: Jason D. Goldman, Fort Collins, CO (US); Philip M. Walker, Fort Collins, CO (US); James L. Long, Fort Collins, CO (US); Eric Peterson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1276 days.

(21) Appl. No.: 13/057,734

(22) PCT Filed: Oct. 14, 2008

(86) PCT No.: PCT/US2008/079882
§ 371 (c)(1),
(2), (4) Date: Feb. 4, 2011

(87) PCT Pub. No.: WO2010/044779
PCT Pub. Date: Apr. 22, 2010

(65) Prior Publication Data
US 2011/0137964 A1 Jun. 9, 2011

(51) Int. Cl.
*G06F 17/30* (2006.01)
*G06T 7/00* (2006.01)

(52) U.S. Cl.
CPC ..... *G06F 17/3012* (2013.01); *G06F 17/30191* (2013.01); *G06F 17/30194* (2013.01); *G06F 17/30244* (2013.01); *G06F 17/30247* (2013.01); *G06T 7/001* (2013.01); *G06T 7/0024* (2013.01)

(58) Field of Classification Search
CPC .......... G06F 7/00; G06F 17/00; G06F 17/30; G06F 17/3012; G06F 17/30244; G06F 17/30194; G06F 17/30247; G06F 17/30191; G06K 9/00; G06T 7/00; G06T 7/40; G06T 1/0007; G06T 7/0024; G06T 7/001
USPC .................. 707/609–611, 694–696, 791–792, 707/821–824, 825, 827–831; 709/203, 206; 382/165–166, 100–105, 115–118; 345/660; 348/207.99, 207.1, 207.11, 348/208.99
See application file for complete search history.

(56) References Cited

U.S. PATENT DOCUMENTS 6,801,327 B1 * 10/2004 Haneda et al. ................ 358/1.1
2002/0107829 A1    8/2002 Sigurjonsson et al.
(Continued)

FOREIGN PATENT DOCUMENTS

EP    2196976    *    6/2010

OTHER PUBLICATIONS

Mor Naaman, "Social Multimedia: Highlighting Opportunities for Search and Mining of Multimedia Data in Social MediaApplications", Published in Multimedia Tools and Applications, Apr. 8, 2010, pp. 1-26.*
(Continued)

*Primary Examiner* — Srirama Channavajjala
(74) *Attorney, Agent, or Firm* — HP Inc. Patent Department (57) ABSTRACT

A data processing system includes a file system manager that organizes content into albums using a tagging technique. The file system manager comprises a filename utility that sets a unique filename for each file of uploaded files across a plurality of albums and an album manager utility that manages an album according to a list of tags. The tags include unique content file references and content metadata, whereby a file instance in a cross-section of the tags is included in multiple albums.

18 Claims, 7 Drawing Sheets

(56) References Cited

U.S. PATENT DOCUMENTS

| | | | |
|---|---|---|---|
| 2002/0154147 A1* | 10/2002 | Battles | 345/660 |
| 2003/0189738 A1* | 10/2003 | Kuwata et al. | 358/527 |
| 2004/0006577 A1 | 1/2004 | Rix | |
| 2005/0102635 A1* | 5/2005 | Jiang et al. | 715/851 |
| 2007/0136244 A1* | 6/2007 | MacLaurin et al. | 707/3 |
| 2008/0120310 A1* | 5/2008 | Khoury | 707/100 |
| 2008/0141108 A1* | 6/2008 | Matsuura | 715/202 |
| 2008/0147726 A1* | 6/2008 | Hwang et al. | 707/104.1 |
| 2009/0055742 A1* | 2/2009 | Nordhagen | 715/716 |

OTHER PUBLICATIONS

Jason D. Goldman et al., "Notification of Transmittal of the International Search Report and the Written Opinion of the International Searching Authority, or the Declaration," International Application No. PCT/US2008/079882 filed on Oct. 14, 2008, Date of Completion: Sep. 26, 2011, Date of Mailing: Sep. 27, 2011, pp. 1-9.

* cited by examiner

FILE SYSTEM MANAGER USING TAGGING ORGANIZATION

BACKGROUND

In a digital photography system, users may collect a lame number of image files on a computer. Two common ways for organizing image files for viewing and accessing are through usage of file system artifacts such as folders and digital photo albums in the form of collections of photographs. Often digital photo albums are directly mapped from file system folders. Typically, a file system is used to organize albums, with one directory representing one album. To place a photograph into an album, an associated media file is copied into the album directory.

A user includes an image in multiple albums by duplicating image files in the file system. Images are typically organized into albums which are similar to Personal Computer (PC) files system folders. Thus, an image copy resides in only one album and duplicate copies are used to store the image in multiple albums. For example, content is commonly organized into discrete collections of albums. To include a single content item into multiple albums, a file is copied into multiple album folders. Organizing the image files is generally a manual process.

In either conventional technique for photograph organization, photo albums and folders are static entities so that individual files and photographs are handled independently of other files and photographs, regardless of duplication. Thus, older photos may be ignored or forgotten when a user creates a new album.

Digital cameras typically integrate with computers by using software that allows uploading of photographs into file system folders and creating related photo albums. For example, many digital cameras are supplied in combination with photograph management software. The management to software enables simple uploading of new photographs into a new photo album or directory. Users can also create new photo albums and manually move or copy photos into the new album, a time consuming process that involves the usual burdens and error-susceptibility of a manual process. Older photos that may fit into a new album are often ignored or forgotten.

SUMMARY

Embodiments of a data processing system include a file system manager that organizes content into albums using a tagging technique. The system manager comprises a filename utility that sets a unique filename for each the of uploaded files across a plurality of albums and an album manager utility that manages an album according to a list of tags. The tags include unique content the references and content metadata, whereby a file instance in a cross-section of the tags is included in multiple albums.

BRIEF DESCRIPTION OF THE DRAWINGS

Embodiments of the invention relating to both structure and method of operation may best be understood by referring to the following description and accompanying drawings.

DETAILED DESCRIPTION

Tagging enables a much more efficient and flexible organization of content, facilitating presentation of various cross-sections of shared content to a user.

Embodiments of data processing systems and associated operating methods avoid the discrete characterization of content into multiple album "folders", enabling more efficient use of storage by allowing multiple albums to reference each file. For the case of content in the form of image files, which are normally stored in multiple thumbnail resolutions, the savings is further increased by avoiding multiple copies of each thumbnail.

Usage of a tagged organization also enables automatic generation of new album views based on dynamic search of image content or metadata. For example, a new album that includes all files with the name "Grandma" could be dynamically generated. Or, using image analysis techniques, automatic views is can be generated to select images, for example, that are nature photos (predominantly green hues), include multiple human faces, include sunsets, or any other selection option.

In an example configuration, tags for usage by a file system manager can identify structures within images.

An illustrative data processing system performs automatic organization of digital photos using facial and pattern recognition.

Photography system users can collect a large number of digital photographs. Managing the organization of the photographs can be labor intensive and time consuming. A data processing system and management software disclosed herein analyzes the pictures and automatically organizes the photographs according pattern recognition. The illustrative system enables photographs to be organized both by subjects or objects within a picture as well as background content indicative of location.

Photo albums or other collections form a good basis for photograph organization, but the process of placing photos into albums is demanding. Other than albums created by default based on upload time, photograph organization can be time-intensive for sorting through pictures individually and placing the pictures selectively into various separate albums. As a lamer collection of photo albums is built, the user may have much difficulty in recognizing that new photographs may fit well with photo albums created previously.

Automated systems and computer-executed methods disclosed herein enable tagging of media files that can take into account how people really want to store and access photographs.

The illustrative automated systems and techniques disclosed herein facilitate sorting of photographs by assisting a user to suitably define criteria for application in organization of the photographs, assisting the user in defining and selecting a context for photograph organization.

Photographs can be analyzed with pattern recognition software to model photograph context. Photographs that share contextual elements can be grouped.

Figure 1:
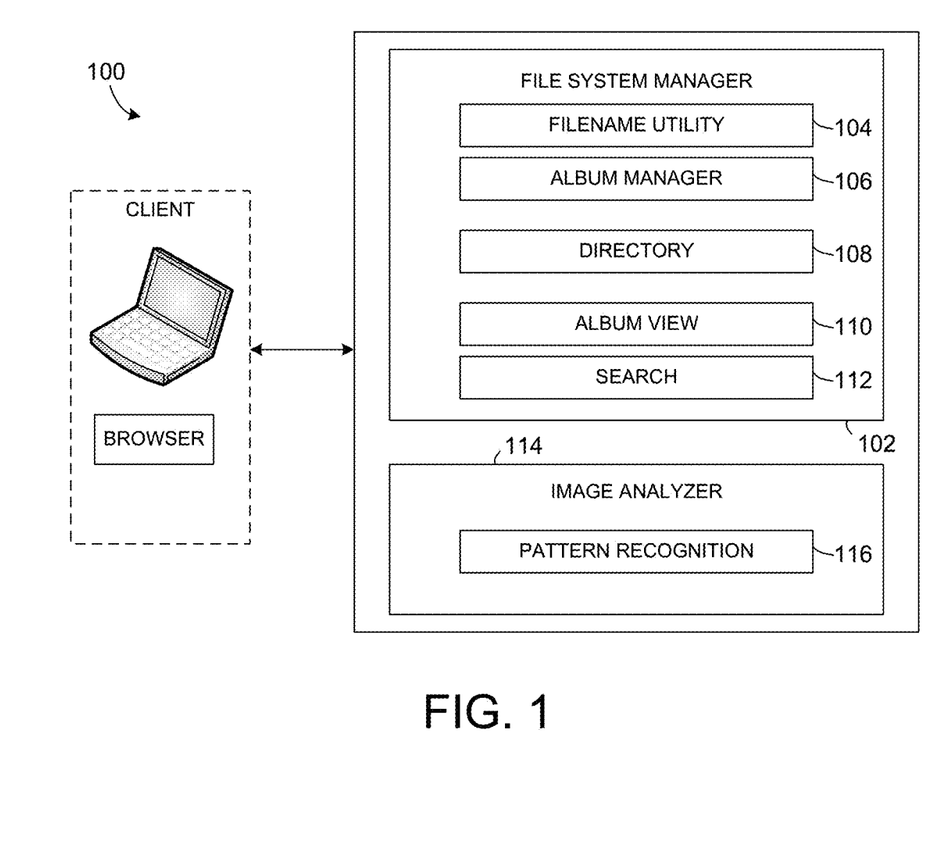
FIG. 1 is a schematic block diagram showing an embodiment of a data processing system including a file system manager that organizes content into albums using a tagging technique.

Referring to FIG. 1, a schematic block diagram illustrates an embodiment of a data processing system 100 including a file system manager 102 that organizes content into albums using a tagging technique. The file system manager 102 comprises a filename utility 104 that sets a unique filename for each file of uploaded files across a plurality of albums and an album manager utility 106 that manages an album according to a list of tags. The tags include unique content file references and content metadata, whereby a file instance in a cross-section of the tags is included in multiple albums.

The uploaded files are given a unique filename, allowing but not requiring a simple nonhierarchical file system storage model so that all files in a single directory.

An album is managed as a list of unique content the references in combination with other metadata representing the album as a whole. For example, metadata information can include identification of name, description, owner, and the like.

In some embodiments, the system manager 102 further comprises a directory utility 108 that manages a list of files in a selected album as to database references. Other arrangements of the directory utility 108 can manage a list of files in a selected album as the system hard links and/or symbolic links. Some directory utilities 108 can manage the files using a combination of techniques.

Accordingly, the "list" of files belonging to an album can be implemented in different embodiments as database references, the system hard links, or other similar methods.

The illustrative the system manager 102 enables new techniques for an album to be generated, for example by manually hand-picking images from existing albums, dynamically generating an album by querying image metadata, dynamically generating an album by file type, the owner, and the like. Tagging of media based on metadata enables organization based on a variety of properties and conditions, for example organization based on date and time of media acquisition, filename, and various information encoded in the image.

The system manager 102 can further comprise a utility 110 that generates an album view according to directions of a user. A search utility 112 dynamically searches for image content and/or metadata according to the user directions for entry into the generated album view.

In some embodiments, the data processing system 100 can further comprise an image analyzer 114 that analyzes image content of the uploaded files according to the user directions for entry into the generated album view.

Data processing system embodiments that include the image analyzer 114 can further include a pattern recognition utility 116 that analyzes an uploaded digital photograph and generates the unique content file references and/or the content metadata according to the analysis. An example of a suitable pattern recognition utility 116 is DIPImage for usage with MATLAB that is made available by the Qualitative Imaging Group (QI) of Delft University of Technology, Delft, The Netherlands.

In various embodiments, a home server webshare system has content organized by tagging.

Home servers can be used to share photographs and other media content with guests over the public Internet in contrast to conventional systems that organize content into discrete albums.

Figure 2:
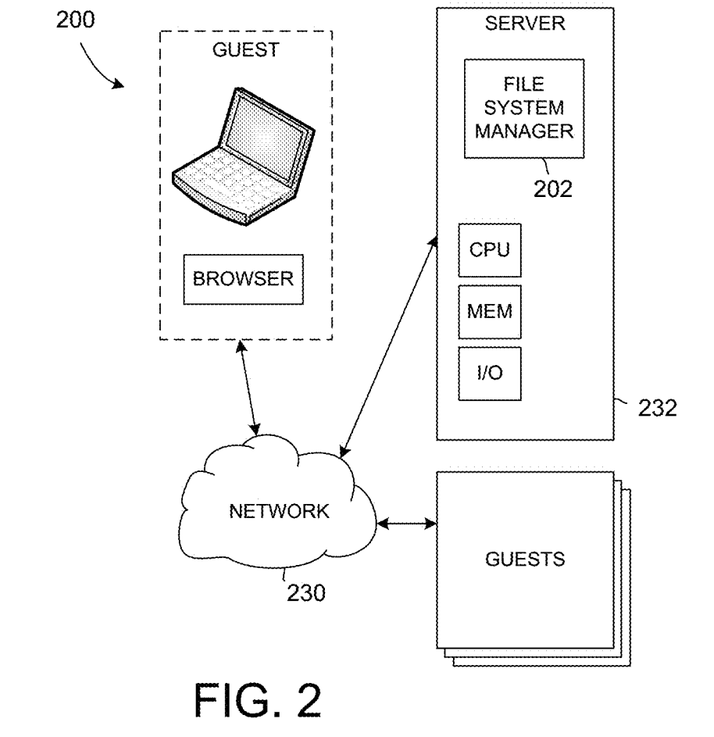
FIG. 2 is a schematic block diagram depicting an embodiment of a network system that includes a file system manager for organizing content into albums using a tagging technique.

Referring to FIG. 2, a schematic block diagram depicts another embodiment of a data processing system 200 that includes a file system manager 202 which organizes content into albums using a tagging technique. The data processing system 200 comprises a network 230 and a server 232 coupled to the network 230 which is configured to run the file system manager 202. The file system manager 202 is configured to share content with guests over the network 230. The guests can have any level of authentication, for example a user can enable access to authenticated invited guests, non-authenticated guests, or the like.

Figure 3A:
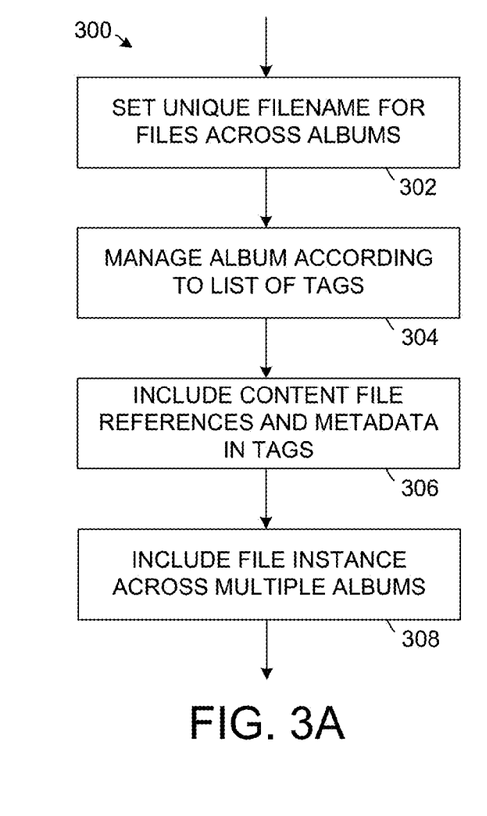
FIGS. 3A and 3B are flow charts illustrating one or more embodiments or aspects of a computer-executed method for organizing content into albums by tagging.
Figure 3B:
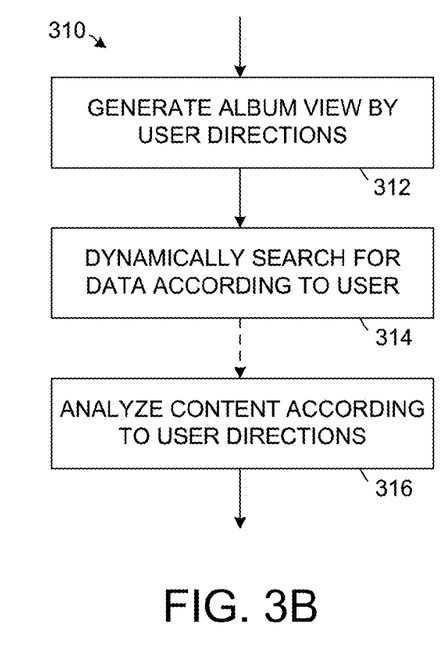

Referring to FIGS. 3A and 3B, flow charts illustrate one or more embodiments or aspects of a computer-executed method for organizing content into albums by tagging. FIG. 3A depicts a method 300 for organizing content comprising setting 302 a unique filename for each file of uploaded files across multiple albums and managing 304 an album according to a list of tags. The tags include 306 unique content file references and content metadata. A file instance in a cross-section of the tags is included 308 in a plurality of albums.

Referring to FIG. 3B, a method 310 can further comprise generating 312 an album view according to directions from a user and dynamically searching 314 for image content and/or metadata according to the user directions for entry into the generated album view.

In some embodiments, image content of the uploaded files can be analyzed 316 according to the user directions for entry into the generated album view.

Figure 4:
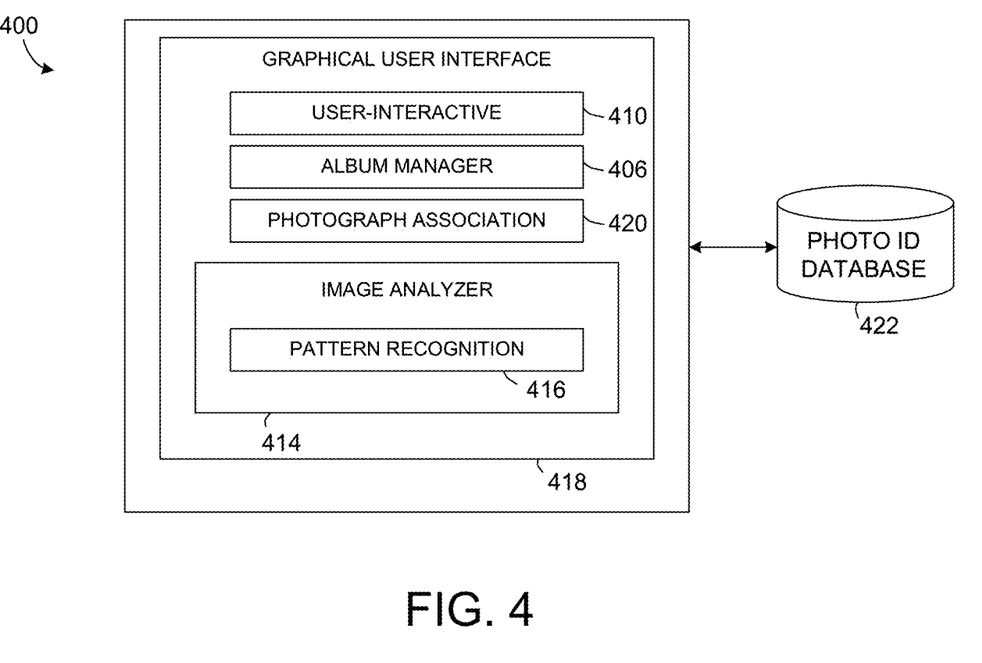
FIG. 4 is a schematic block showing an embodiment of a data processing system that facilitates setting of tags by a user.

Referring to FIG. 4, a schematic block shows an embodiment of a data processing system 400 that facilitates setting of tags by a user. The illustrative data processing system 400 comprises a graphical user interface 418 that models context of photographic content. The illustrative graphical user interface 418 comprises a pattern recognition utility 416 that analyzes an uploaded digital photograph, detects patterns in the digital photograph, and generates a collection of detected patterns. A user-interactive utility 410 presents the collection of detected patterns to a user for identification and receives identification for corresponding detected patterns selected by the user. A photograph association utility 420 associates a set of identifications with the photograph.

The data processing system 400 can further comprise a photographic identification database 422. The photograph association utility 420 associates the set of identifications with a photograph using the photographic identification database.

The graphical user interface 418 models context of photographic content configured to organize photographs by subjects within an image and background features indicative of location.

The photograph association utility 420 can associate the set of identifications with a photograph as unique content the references and/or content metadata. In an example implementation, the data processing system 400 can further comprise an album manager utility 406 that manages an album according to a list of tags. The tags can include unique content the references and the content metadata, whereby a file instance in a cross-section of the tags is included in a plurality of albums.

The data processing system 400 can further comprise the utility 410 that generates an album view according to directions of a user. A search utility 412 dynamically searches for image content and/or metadata according to the user directions for entry into the generated album view.

In some embodiments, the data processing system 400 can further comprise an image analyzer 414 that analyzes image content of the uploaded files according to the user directions for entry into the generated album view.

In an example of operation, a user uploads a photograph, and the data processing system 400 analyzes the photograph using the pattern recognition utility 416. Analysis functionality of the pattern recognition utility 416 scans the photograph for detection and identification of "interesting" patterns such as faces or other elements. During analysis, multiple faces or other patterns may be recognized. The result of the pattern recognition analysis is a collection of the identifications. The user can be presented with feedback about the identifications in an interactive engagement. The user can elect to ignore a particular pattern or to name the pattern. For example, in a photograph of two women, the pattern recognition utility can indicate two regions that include the two faces, for example enclosing a region of interest within a visible boundary line on a display or other type of highlighting. In an example organization session, the user may ignore the first region and identify the second, for instance as "Mom". The resulting set of identifications is associated with the photograph using a database as part of a photograph album manager 406. Photographs that are classified by the pattern recognition utility 416 as the same person, corresponding to the same facial pattern, or perhaps a classified location which can be grouped in the same photo album. The album may already exist, for example the picture of Mom is added to a "Mom" album, or the album can be created if not in existence. Photographs with multiple patterns may be selectively placed into multiple albums. Therefore, a picture with Mom and Dad at the beach may be automatically placed into three albums including a "Mom" album, a "Dad" album, and a "beach" album.

The pattern recognition utility 416 can include texture analysis, edge analysis, and the like to detect and recognize backgrounds such as landscaping, buildings, and other features, which can be named by the user for forming tags.

Similar operations can also be performed at other times on existing collections of photographs. Therefore, a user obtaining photographs from other sources, for example from friends or downloads, can apply the same process.

The automation enabled by the data processing system 400 reduces the user's time expenditure for manually moving and copying pictures from album to album. Constructing and accumulating context information based on the content of the photograph enables organization to be performed in a manner more meaningful to the user. The data processing system 400 and associated methods grant to the user the opportunity to express preferences for some selected patterns and to suppress or ignore other patterns, overcoming the difficulty of "false" pattern matches that are not meaningful. Enabling the user to name selected patterns allows meaningful naming of albums by the user.

The data processing system 400 and associated methods enable meaningful organizations, so that photographs can be organized to exist in multiple locations, greatly facilitating the search and discovery of photographs of interest to the user, even if the search begins from different contexts.

Figure 5:
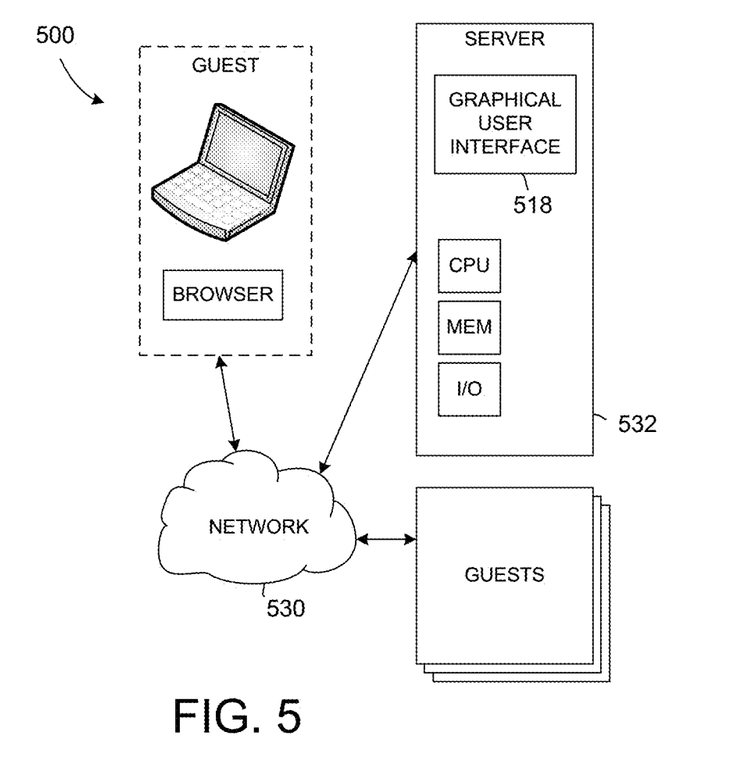
FIG. 5 is a schematic block diagram depicting an embodiment of a network system that facilitates setting of tags by a user.

Referring to FIG. 5, a schematic block diagram depicts another embodiment of a data processing system 500 that facilitates setting of tags by a user. The illustrative data processing system 500 comprises a network 530 and a server 532 coupled to the network and configured to run the graphical user interface 518. The graphical user interface 518 models context of photographic content.

Figure 6A:
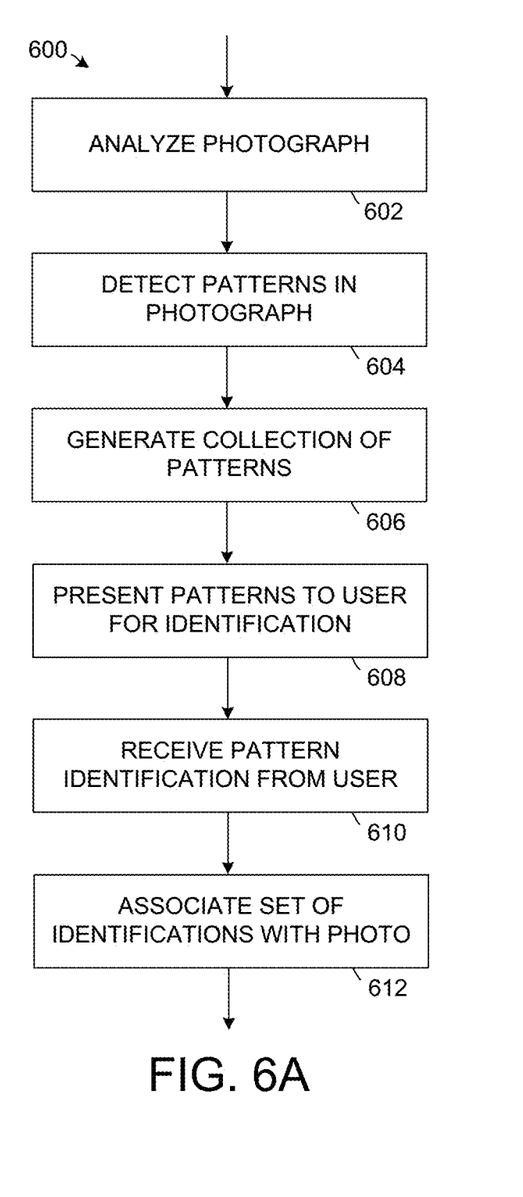
FIGS. 6A, 6B, and 6C are flow charts illustrating one or more embodiments or aspects of a computer-executed method for modeling context of photographic content.
Figure 6B:
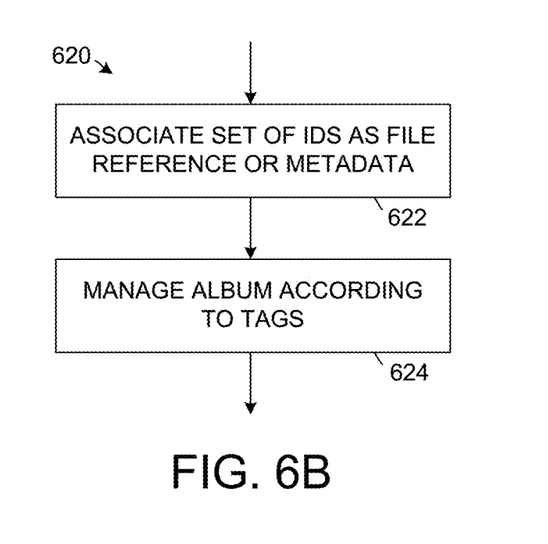
Figure 6C:
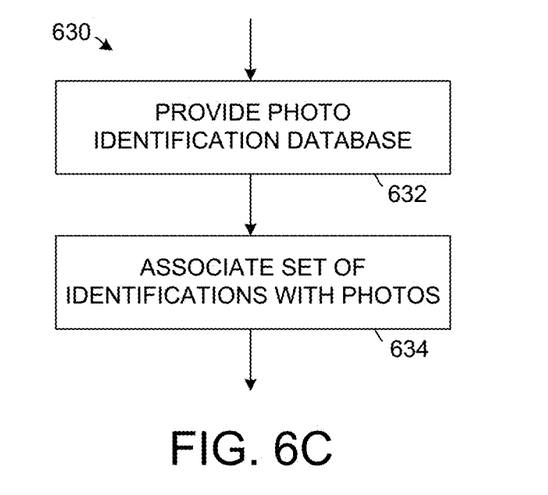

Referring to FIGS. 6A, 6B, and 6C, flow charts illustrate one or more embodiments or aspects of a computer-executed method for modeling context of photographic content. FIG. 6A depicts a context modeling method 600 comprising analyzing 602 an uploaded digital photograph, detecting 604 patterns in the digital photograph, and generating 606 a collection of detected patterns. The collection of detected patterns is presented 608 to a is user for identification, and identification for corresponding detected patterns selected by the user is received 610. A set of identifications is associated 612 with the photograph.

Referring to FIG. 6B, a computer-executed method 620 for modeling context of photographic content can further comprise associating 622 the set of identifications with the photograph as unique content file references and/or content metadata, and managing 624 an album according to a list of tags. The tags include the unique content file references and the content metadata, whereby a file instance in a cross-section of the tags is included in multiple albums.

Referring to FIG. 6C, in some embodiments a computer-executed method 630 for modeling photographic content context can comprise providing 632 a photographic identification database, and associating 634 the set of identifications with the photograph using the photographic identification database.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for organizing content into albums by tagging, and modeling context of photographic content.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system embodied in computer-readable program code stored on a non-transient computer-readable medium and executable by a processor, the data processing system when executed by a processor comprising:
a file system manager that organizes content into albums by tagging comprising: a filename utility' that sets a unique filename for each file of uploaded files across a plurality' of albums: and
an album manager utility that manages an album according to a list of tags, the tags including unique content file references and content metadata, whereby a file instance in a cross-section of the tags is included in a plurality of albums;
the file system manager further comprising:
a utility that generates an album view according to directions of a user; and
an image analyzer that analyzes image content of the uploaded files according to the user directions for entry into the generated album view.

2. The system according to claim 1 further comprising:
the file system manager further comprising:
a directory utility that manages a list of files in a selected album as database references.

3. The system according to claim 1 further comprising:
the file system manager further comprising:
a directory utility that manages a list of files in a selected album as file system hard links and/or symbolic links.

4. The system according to claim 1 further comprising:
the file system manager further comprising:
a utility that generates an album view according to directions of a user; and
a search utility that dynamically searches for image content and/or metadata according to the user directions for entry into the generated album view.

5. The system according to claim 1 further comprising:
a pattern recognition utility that analyzes an uploaded digital photograph and generates the unique content file references and/or the content metadata according to the analysis.

6. The system according to claim 1 further comprising:
a network;
a server coupled to the network and configured to run the file system manager; and
the file system manager configured to share content with guests over the network.

7. A computer-executed method embodied in computer-readable program code stored on a non-transient computer-readable medium for organizing content into albums by tagging, the method when executed by a processor comprising:
setting a unique filename for each file of uploaded files across a plurality of albums: managing an album according to a list of tags, the tags including unique content file references and content metadata; and
including a file instance in a cross-section of the tags in a plurality of albums;
further comprising: generating an album view according to directions from a user; and
analyzing image content of the uploaded files according to the user directions for entry into the generated album view.

8. The method according to claim 7 further comprising:
generating an album view according to directions from a user; and
dynamically searching for image content and/or metadata according to the user directions for entry into the generated album view.

9. A data processing system embodied in computer-readable program code stored on a non-transient computer-readable medium, which when executed by a processor comprises:
a graphical user interface that models context of photographic content comprising:
a pattern recognition utility that analyzes an uploaded digital photograph, detects patterns in the digital photograph, and generates a collection of detected patterns;
a user-interactive utility that presents the collection of detected patterns to a user for identification and receives identification for corresponding detected patterns selected by the user; and
a photograph association utility that associates a set of identifications with the photograph.

10. The system according to claim 9 further comprising:
the photograph association utility that associates the set of identifications with the photograph as unique content file references and/or content metadata; and
an album manager utility that manages an album according to a list of tags, the tags including the unique content file references and the content metadata, whereby a file instance in a cross-section of the tags is included in a plurality of albums.

11. The system according to claim 9 further comprising:
a photographic identification database; and
the photograph association utility that associates the set of identifications with the photograph using the photographic identification database.

12. The system according to claim 9 further comprising:
the graphical user interface that models context of photographic content configured to organize photographs by subjects within an image and background features indicative of location.

13. The system according to claim 9 further comprising:
a utility that generates an album view according to directions of the user; and
a search utility that dynamically searches for image content and/or metadata according to the user directions for entry into the generated album view.

14. The system according to claim 9 further comprising:
a utility that generates an album view according to directions of the user; and
an image analyzer that analyzes image content of the uploaded files according to the user directions for entry into the generated album view.

15. The system according to claim 9 further comprising:
a network;
a server coupled to the network and configured to run the graphical user interface; and
the graphical user interface that models context of photographic content.

16. A computer-executed method embodied in computer-readable program code stored on a non-transient computer-readable medium for modeling context of photographic content, the method when executed by a processor comprising:

analyzing an uploaded digital photograph;
detecting patterns in the digital photograph;
generating a collection of detected patterns;
presenting the collection of detected patterns to a user for identification;
receiving identification for corresponding detected patterns selected by the user; and
associating a set of identifications with the photograph.

17. The method according to claim 16 further comprising:
associating the set of identifications with the photograph as unique content file references and/or content metadata; and
managing an album according to a list of tags, the tags including the unique content file references and the content metadata, whereby a file instance in a cross-section of the tags is included in a plurality of albums.

18. The method according to claim 16 further comprising:
providing a photographic identification database; and
associating the set of identifications with the photograph using the photographic identification database.

* * * * *